United States Patent [19]

Lear

[11] 3,885,759

[45] May 27, 1975

[54] NOSE WHEEL STEERING SYSTEM

[75] Inventor: William P. Lear, Verdi, Nev.

[73] Assignee: Lear Avia Corporation, Reno, Nev.

[22] Filed: June 21, 1973

[21] Appl. No.: 372,400

[52] U.S. Cl.................. 244/50; 73/178 T; 180/79.1
[51] Int. Cl.......................... B64c 25/50; B62d 5/04
[58] Field of Search ............... 73/178 T; 114/144 R;
180/79.1, 79.2 A; 235/150.2, 150.22;
244/50, 77 D, 77 M, 111; 318/563, 564, 583,
587; 340/27 SS, 30

[56] References Cited
UNITED STATES PATENTS

| | | | |
|---|---|---|---|
| 2,814,452 | 11/1957 | Blanchard et al...................... | 244/50 |
| 2,953,324 | 9/1960 | Barr et al.............................. | 244/50 |
| 3,067,832 | 12/1962 | Wohl ................................ | 244/50 X |
| 3,551,776 | 12/1970 | Tawfik et al................. | 244/77 M X |

Primary Examiner—Trygve M. Blix
Assistant Examiner—Stephen G. Kunin
Attorney, Agent, or Firm—Richard A. Marsen

[57] ABSTRACT

Smooth and safe turning of the aircraft is insured while it is taxied along the ground. Sizable planes can be controlled therewith, including business jets and airliners. Unintentional abrupt turns are prevented by the control system hereof. A variable authority command supersedes the pilot's own steering command. The authority signal is a function of both the plane's concurrent ground speed and the degree of the pilot's command. Wider latitude of steering is permitted by the system at the lower ground speeds, as ± 45° when below 10 knots; tapering off to a tighter latitude, as to only ± 5° when above 45 knots.

7 Claims, 3 Drawing Figures

NOSE WHEEL STEERING SYSTEM

BACKGROUND AND SUMMARY OF THE INVENTION

The steering system incorporates a control of variable authority that is exerted in place of the pilot's own command. Steering occurs on the ground with the nose wheel actuated angularly. Variable authority means the degrees of turn (in either direction) that a pilot may effect upon the front wheel of the aircraft despite his direct operation of the rudder pedal. The steering command to the servomechanism for the nose wheel is not proportional to the pilot's command, as heretofore. Instead, it is made to correspond in a predetermined safer way that depends upon the aircraft's speed along the ground as well as the pilot's attempted command.

The system hereof automatically provides for maximum steering available to the pilot in taxiing, as up to ± 45° nominal for a business jet plane, when its speed is below 10 knots. The slower mode permits the wider angular turns. The control is tapered sharply to 10° at 20 knots. At higher ground speeds on up to lift-off, the angular steering command potential is modified in accordance to the speed. In the exemplary application, as for a "Learjet 25," the maximum effective steering of the nose wheel is made to be only ± 5° when it is above 45 knots. Other variable authority command parameters are feasible. Variable authority hereof provides smoother and simpler operation of the nose wheel steering, as once steering is engaged the pilot has to be concerned only with the low authority speed limitation point.

The control authority is effected by a novel computer circuit that is superimposed upon the direct command on the rudder pedal. The control computer is fed by a plurality of signals that correspond to plane ground velocity. These velocity signals are each combined with a further signal that corresponds to the pilot's actual steer command. Such plural circuits are a redundant and fail-safe arrangement to provide maximum reliability. A voting circuit selects the mid-value resultant signal, as the new command for the servomotive steering of the nose wheel actuator. The pilot thus can engage high priority steering without being concerned as to the rudder pedal position, with assurance of no precipitous steering reaction. The result is smooth turning in the desired direction, without undesirable side loads or abrupt turning. The variable authority system hereof has been approved and certified by the FAA.

THE DRAWINGS

DESCRIPTION OF THE INVENTION

Figure 1:
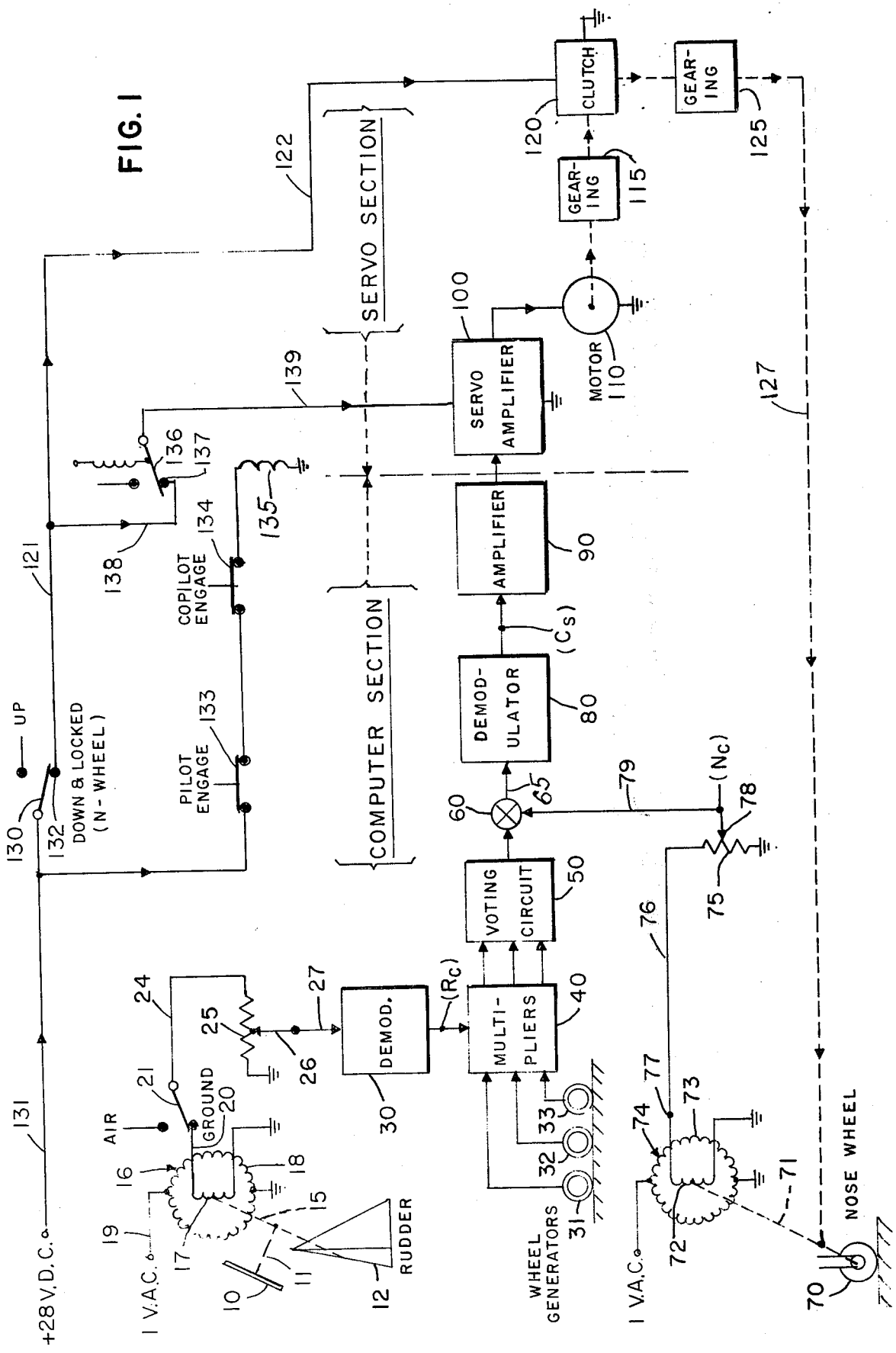
FIG. 1 is a schematic block diagram of the exemplary variable authority steering control system.

The variable authority system is drawn schematically in FIG. 1. Actuation of the rudder pedal 10 by the pilot is transmitted by suitable linkage 11 to the rudder 12. The angular position of the rudder command is coupled by linkage 15 to angular translation unit 16, such as an a.c. induction "Selsyn" device. Its rotor coil 17 is angularly positioned within stator winding 18 by the linkage 15. Winding 18 is energized by a reference a.c. voltage (as at 1 volt) by lead 19. The signal at output lead 20 is proportional to the angular position (to right or left of neutral) of rotor 17 in stator 18, as understood by those skilled in the art.

Accordingly, the a.c. signal out of unit 16 represents the angular deviation (phased + or −) of the rudder 12, which in turn corresponds to its actuation or manual command by the pilot upon pedal 10. The signal at output lead 20 thus represents the rudder pedal command in angular terms. The signal at lead 20 is connected to potentiometer 25 via lead 24 through switch arm 21 when in "ground" position as indicated in the Figure. When the plane is in the "air," the switch 21 is up, with no signal transmitted. The rudder angular command signal is derived at proper design level for demodulator 30 by adjustment of the arm 26 of potentiometer 25. Arm 26 conductively connects to demodulator 30 through lead 27.

Demodulator 30 rectifies the a.c. command signal and impresses it as the command voltage ($R_c$) upon the several multipliers in unit 40 of the system's Computer Section. A plurality of wheel generators, preferably three 31, 32 and 33 impress their speed signals upon respective multipliers in unit 40, as described hereinafter in connection with FIG. 2. Generators 31, 32 and 33 are driven when the aircraft is taxiing along the ground, in well-known manner. In actual practice, the variable frequency wheel generators are already mounted on each main gear wheel as part of the aircraft's anti-skid system. The wheel generators may instead provide direct current outputs rather than variable frequency for the multipliers. In the latter event, demodulator 30 is unnecessary. In the exemplary system the generators selected were those mounted at: right inboard; left inboard; and right outboard. Three rather than four are used so that we can use a voting circuit 50, as described hereinafter. The voting circuit automatically selects the mid-value output of the three multipliers of unit 40, and then impresses it upon an adder-amplifier 60. Also impressed upon adder 60 is the angular position of the nose wheel 70 of the aircraft.

The angular position of nose wheel 70, i.e. plus or minus with respect to the longitudinal axis of the aircraft, is coupled via linkage 71 to rotor 72 of induction transmitter 74. Its stator 73 is connected to a reference a.c. voltage terminal, as at 1 volt. The rotor's angular signal output which is that of the nose wheel angular position, is imparted to potentiometer 75 via lead 76 from terminal 77. Its tap 78 is adjusted for the circuit to provide the nose wheel angular signal $N_c$. The latter is directly fed to adder-amplifier 60 by lead 79. The output of adder 60 is impressed upon demodulator 80, which then is amplified at 90, completing the Computer Section. The circuital operation and functions of the authority computer components are detailed in connection with FIGS. 2 and 3 hereinafter.

The Servo Section comprises servo amplifier 100 that controls drive motor 110 by amount and direction, as may be required by the variable authority system. The servo amplifier 100 may be of the well-known bridge type, or equivalent. The motor 110 is connected therein to respond in direction per the phase of the demodulated control signal $C_s$ out of units 80 and 90. The magnitude of $C_s$ commands motor 110 accordingly, which in turn is mounted to mechanically steer the nose wheel 70. As the nose wheel steering command approaches to the angle predetermined by the authority design scaled into the system, the command "error" signal $C_s$ smoothly approaches zero in magnitude, and the motor is held at that deflection in the steering. The variable authority operational curve V/A is shown in FIG. 3, its meaning being described hereinafter.

The steering motor 110 is mechanically coupled to nose wheel 70 through gearing sets 115 and 125, with an intermediate electromagnetic clutch 120, as indicated schematically in FIG. 1 at 127. The motor, gearing and clutch preferably are arranged as a unitary actuator mounted on the strut adjacent the nose wheel mechanism. Clutch 120 is deenergized when the aircraft is aloft. The nose wheel switch arm 130 is UP then, with 28 volt bus 131 disconnected. Switch arm 130 is actuated to contact position 132, as shown, when the nose wheel is set for the landing. When wheel 70 is thus ready for landing, local switch 130 is actuated to its "Down and Locked" position against contact 132. This connects bus 131 directly to clutch 120 through switch 130, 132 and lines 121, 122 to energize it. The motor 110 thereupon becomes mechanically engaged with the nose wheel 70 through the gearing 115, 125. When the motor 110 is not yet energized, the inertia of the motor times the gear ratio when coupled to the nose wheel will damp out any nose wheel shimmy which might otherwise exist. Whenever the nose gear is not down and locked, the clutch is thus deenergized and the nose wheel can freely be aligned as required for landing or for retraction into the nose wheel well.

Servo amplifier 100 is not placed into operation until both pilot and copilot push-to-engage respective switches 133, 134, which are connected in series. In this condition, bus 131 energizes solenoid 135 to close relay switch arm 136 upon contact 137. Secondary bus line 121 is thereupon connected to energize servo amplifier 100 through leads 138, 139. When the plane lands, command signal switch arm 21 connects to ground contact 20, and the rudder pedal angle transmitter 16 to the Computer Section to initiate the control authority of the steering system for nose wheel 70. The Down & Locked switch 130, 132 is then in circuit as well, with clutch 120 connecting motor 110 to the nose wheel through gearing 115, 125 and 127. The Servo Section thus becomes operative, as will now be understood by those versed in the art.

Figures 2, 3:
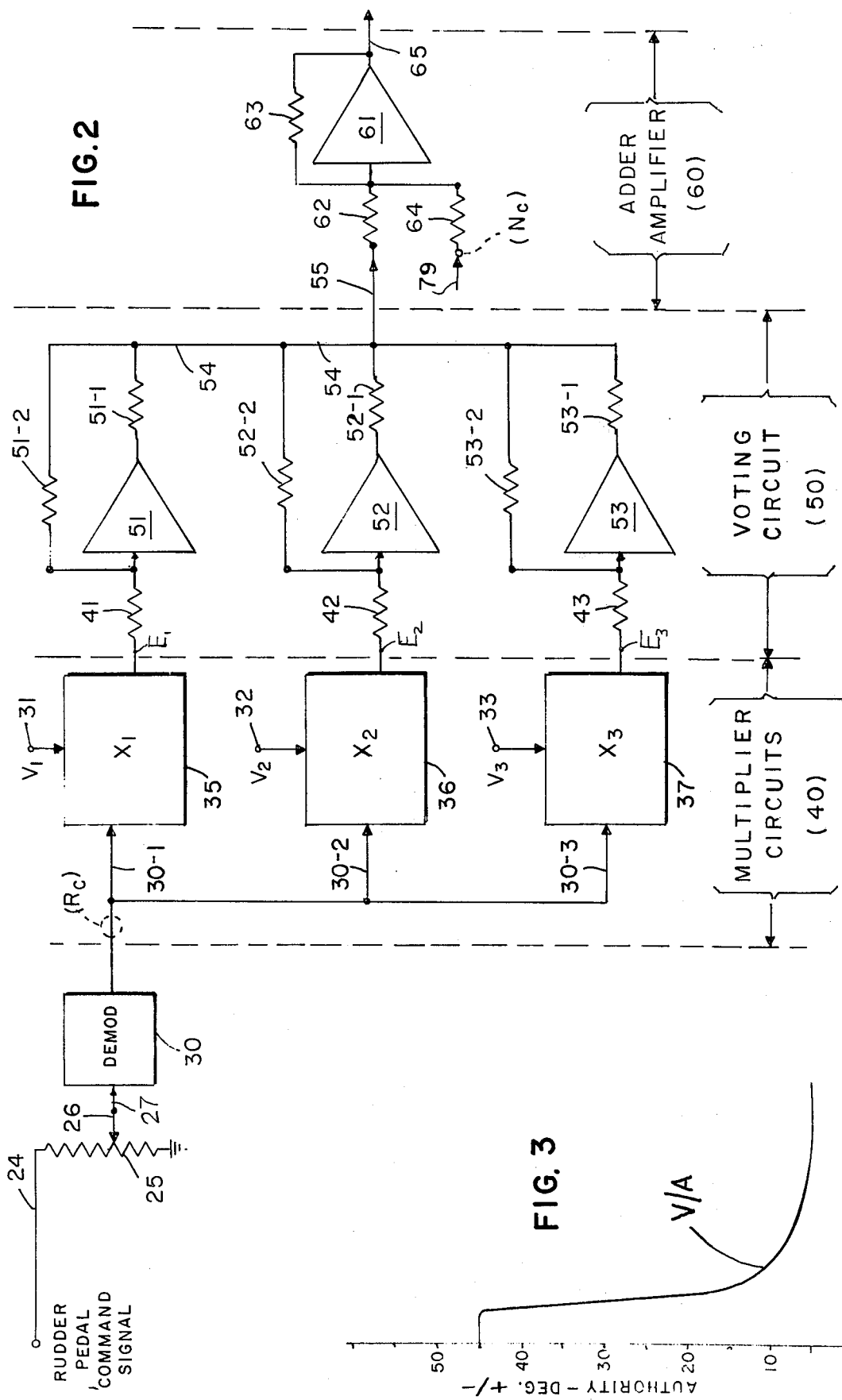
FIG. 2 is a functional circuit diagram of its variable authority control section.
FIG. 3 is a characteristic curve of the steering control that is effective with the automatic variable authority vs the plane's ground speed.

FIG. 2 is a circuit diagram of the exemplary variable authority control circuit, designated the Computer Section. The rudder pedal command of the pilot is transmitted by transducer 16 to potentiometer 25, as set forth hereinabove. The pilot's command is translated as an a.c. signal phased in accordance with the angular direction, and of magnitude proportional to its extent from zero. After demodulation by unit 30, it is the $R_c$ signal herein. Signal $R_c$ is impressed upon the multiplier circuits 40 by leads 30-1, 30-2, 30-3. Circuit 35 is multiplier $X_1$ to which signal $R_c$ is connected by lead 30-1, and velocity signal $V_1$ from wheel generator 31. Similarly, circuit 36 is multiplier $X_2$ to which $R_c$ is applied via lead 30-2, and velocity signal $V_2$ from 32; and circuit 37 is multiplier $X_3$ receiving $R_c$ via lead 30-3, and velocity signal $V_3$ from 33.

The multipliers $X_1$, $X_2$, $X_3$ each are arranged to provide the product $R_c \cdot (1/V_n)$, wherein the respective velocity signals $V_1$, $V_2$, $V_3$ are divided into $R_c$. With such inverse $V_n$ relation the variable authority steering control is provided as set forth: the higher the ground speed ($V_n$) of the aircraft, the lower is the top steering control angle (V/A) that the pilot can effect on the nose wheel; and vice versa. Reference is made to the exemplary variable authority steering curve V/A in FIG. 3. The steering system hereof is similar in operation to the normal aircraft steering system, except that it is always in high authority, and the steering authority (for maximums) is modified as a function of aircraft ground speed. From zero to 10 knots, up to 45° of steering is available, tapering off to 5° above 45 knots. Other related curve shapes may of course be incorporated within the scope of the present invention.

The "multiplied" product, properly scaled, of $R_c \cdot (1/V_n)$ provides the functional control curve V/A, wherein $n = 1, 2, 3$ of $V_n$ are from respective wheel generators 31, 32, 33. Table I illustrates typical $V_n$ input parameters from a generator with a generator wheel 18 inches in diameter. Ground speed is in knots, with generator frequency proportional thereto. The Gain K column references low velocity, as to 5 knots, at 1.00 and descends in magnitude inversely, as $\alpha$ $(1/V_n)$, until it reaches 0.13 at 60 knots. Design factors keep it at 0.13 above 60 knots.

TABLE I

VARIABLE AUTHORITY PARAMETERS

| Aircraft Velocity (Knots) | Wheel Speed (RPM) | Generator Frequency (Hz) | Gain K $X_1$ or $X_2$ or $X_3$ |
|---|---|---|---|
| 0 | 0 | 0 | — |
| 5 | 108 | 64 | 1.00 |
| 10 | 216 | 128 | 0.98 |
| 15 | 324 | 192 | 0.33 |
| 20 | 432 | 256 | 0.24 |
| 25 | 540 | 320 | 0.17 |
| 30 | 648 | 384 | 0.16 |
| 35 | 755 | 453 | 0.15 |
| 40 | 864 | 512 | 0.14 |
| 45 | 970 | 573 | |
| 50 | 1080 | 640 | 0.135 |
| 55 | | | |
| 60 | 1296 | 768 | 0.13 |
| 65 | | | |
| 70 | 1512 | 896 | 0.13 |

Note: Wheel diameter at 18"; 1 Knot = 21.6 RPM Generator Frequency = 36 Hz/rev

The multipliers $X_1$, $X_2$, $X_3$ each combine the inverse of $V_n$ with the concurrent $R_c$ signal to provide the respective multiplied authority signals to voting circuit 50. The failsafe use of three generators is circuitally treated through mid-value selection by the voting circuit. The output signals of the multipliers are respectively impressed upon the voting operational amplifiers 51, 52, 53 through coupling resistors 41, 42, 43. These amplifiers have individual output resistors 51-1, 52-2, 53-2, and shunt resistors 51-2, 52-2, 53-2. Their resistors tie to common output lead 54 and line 55. The exemplary operational amplifiers 51, 52, 53 have $k = 0.68$. Voting circuits as 50 are well known in analog computer technology, and reference is made thereto for operational and circuital details thereof.

In carrying out the principles of the present invention, the velocity generated signals $V_n$ may be d.c. or a.c. as stated. The exemplary velocity signals $V_1$, $V_2$, $V_3$ are a.c. as shown in Table I, rising to the order of 1,000 Hz above 70 knots ground speed. Their frequency is linear with plane velocity. The multipliers $X_1$, $X_2$, $X_3$ are of the pulse width modulation type. Their duty cycle is varied: As the frequency of input $V_n$ increases, the duty cycle of its multiplier $X_n$ is increased whereby the amplification thereof is correspondingly decreased. The Gain K factor designed therein is generally $\alpha$ ($1/V_n$), with the low and high parameter factors as indicated in the Table.

low-up $N_c$ produces a net error signal that "stops" motor 110 when it is within its "final" desired authority angle. The follow-up signal $N_c$ of nose wheel 70 locates its position to the Computer Section and its error feedback relation stops the servo drive at units 80, 90 and 100 for motor 110 in accordance with curve V/A, as will now be understood by those skilled in the art.

TABLE II

VARIABLE AUTHORITY PERFORMANCE
Rudder Pedal Command SET AT 45°

| Velocity Signal $V_1$ (Knots) | Command Per $V_1$ ($E_1$) | Velocity Signal $V_2$ (Knots) | Command Per $V_2$ ($E_2$) | Velocity Signal $V_3$ (Knots) | Command Per $V_3$ ($E_3$) | FINAL STEER COMMAND |
|---|---|---|---|---|---|---|
| 1.    0* | 45.° | 5.1 | 45.° | 5.1 | 45.° | 45.° |
| 26.5°  30.7 | 6.5° | 0 | 45.° | >45 |  | 5.° |
| 36.5°  0 | 45.° | >45 |  | 5.° | 30.7 | 6.5° |
| 46.5°  >45 |  | 5.° | 30.7 | 6.5° | 0 | 45.° |
| 55.°  5 |  | 45.° | 30.7 | 6.5° | 0 | 45.° |
| 65.°  0 | 45.° | 15 |  | 15.° | 30.7 | 6.5° |
| 76.5°  30.7 | 6.5° | 0 | 45.° | 40 |  | 6.0° |

*Zero signal: Open or short circuit.

When the three velocity generators and the multipliers 40 are functioning, and the command signal $R_c$ is as well, the voting circuit 50 selects their resultant mid-value signal as appears at 41, 42 or 43. Table II shows the performance of the exemplary system in seven tests, each with the rudder pedal command set at 45°. The output signals $E_n$ of the respective multipliers $X_1$, $X_2$, $X_3$ are $E_1$, $E_2$, $E_3$; being their individual authority commands. In Table II their net +/− angular extent is listed in the $E_n$ columns. However, only the mid-value ($E_m$) is selected by the voting circuit to become the corresponding V/A final steer command from the Servo Section. This command, in degrees is in the end column. The end limits of curve V/A of FIG. 3 are preset by circuit parameter design, as to ±45° for the maximum and to ± 5° for the minimum steering ranges.

The voted signal $E_m$ is impressed upon operational amplifier 61 by lead 55 through coupling resistor 62. Nose wheel position follow-up signal $N_c$ connects thereto via lead 79 and coupling resistor 64. Amplifier 61 is shunted by resistor 63. Its output is conducted through lead 65 to demodulator 80, see FIG. 1. The overall system remains operational even if a wheel generator signal fails wherein a zero $V_n$ signal occurs, as noted in Table II.

The nose wheel follow-up signal $N_c$ from rotor 72 is a.c., as hereinabove set forth. Its phase and magnitude correspond to the angular position that the nose wheel 70 is at. The wheel generator signals $V_n$ are also a.c. with frequency proportional to their respective speeds or RPM, see Table I. The signal levels of $N_c$, $R_c$ and $V_n$ are suitably scaled in the circuitry to effect the control action hereof, as will be understood by those skilled in the art. Further, nose wheel follow-up signal $N_c$ is introduced into operational amplifier 61 opposite in phase to that effected by command signal $R_c$ through demodulator 30.

Nose wheel signal $N_c$ is demodulated at unit 80 to in turn counter the oppositely phased variable authority command signal also thereat. The resultant of these oppositely phased signals is to produce an error type of signal for the final authority command $C_s$ to amplifier 90 and in turn to the Servo Section. This arrangement permits the pilot commanded rudder position as modified by the final variable authority signal relation V/A to be effected upon nose wheel 70. When wheel 70 is within the proper V/A range for the concomitant ground speed ($V_n$), the signal counterbalance of follow-up $N_c$ produces a net error signal that "stops" motor 110 when it is within its "final" desired authority angle. The follow-up signal $N_c$ of nose wheel 70 locates its position to the Computer Section and its error feedback relation stops the servo drive at units 80, 90 and 100 for motor 110 in accordance with curve V/A, as will now be understood by those skilled in the art.

The Computer Section in effect forms an error corrected signal ($C_s$) at amplifier 90 to servo amplifier 100, based upon the difference of the pilot's commanded position generated as $R_c$, the final steering curve V/A, and the follow-up nose wheel position generated as $N_c$. When the transmitted signal $N_c$ satisfies the predetermined design position as generated within curve V/A, the nose wheel angle is thereupon correctly controlled to within the override authority hereof.

What is claimed is:

1. A steering system for an aircraft having a pilot steering command member and a nose wheel that effects steering of the aircraft on the ground, comprising first transducer means coupled to the command member for generating an a.c. signal ($R_c$) that corresponds in phase and magnitude to the steering command of the pilot on the member, generating means of plural signals ($V_n$) that correspond to the ground speed of the aircraft, multiplier means including an individual multiplier unit for each of said ($V_n$) signals to provide $n$ resultant signals ($E_n$) each of which corresponds to $R_c \cdot (1/V_n)$ respectively, a voting circuit with a section connected to each $E_n$ signal, said voting circuit selecting as its output the mid-value ($E_m$) of the ($E_n$) signals, second transducer means coupled to the nose wheel for generating an a.c. signal ($N_c$) that corresponds in phase and magnitude to the angular position of the nose wheel, circuit means responsive to said ($E_m$) and ($N_c$) signals to provide a net servomotor control signal, and servomotor means mechanically coupled to the nose wheel and in circuit connection with said circuit means whereby the nose wheel is angularly positionable for steering the aircraft within a predetermined variable authority command range that corresponds to the elected ($E_m$) signal.

2. A steering system for an aircraft as claimed in claim 1, in which said multiplier units are proportioned to provide said variable authority command range with wider steering latitude made available at the lower ground speeds, which range tapers off to a tighter latitude at the higher ground speeds.

3. A steering system for an aircraft as claimed in claim 2, in which a steering latitude range of the order of ±45° is thereby made available at ground speeds below 10 knots, which range is tapered down to a steering latitude of the order of ±5° when the aircraft ground speed is above 45 knots.

4. A steering system for an aircraft as claimed in claim 3, in which said ground speed generating means are wheel generators that provide corresponding a.c. signals ($V_n$) at respective frequencies that correspond to the ground speed of the aircraft, and said multiplier units are of the pulse width modulation type arranged with a duty cycle that increases with the frequency of ($V_n$) thereby effecting the gain (K) of each ($V_n$) in inverse relation.

5. A steering system for an aircraft as claimed in claim 1, in which said ground speed generating means are wheel generators that provide corresponding a.c. signals ($V_n$) at respective frequencies that correspond to the ground speed of the aircraft, and said multiplier units are of the pulse width modulation type arranged with a duty cycle that increases with the frequency of ($V_n$) thereby effecting the gain (K) of each ($V_n$) in inverse relation.

6. A steering system for an aircraft as claimed in claim 5, in which the a.c. nose wheel angular follow-up signal ($N_c$) is connected into said circuit means in opposite phase relation to that of the pilot command signal ($R_c$) thereat and provide a final control signal ($C_s$) to said servomotor means whereby its deflection of the nose wheel is within the range established by the variable authority command.

7. A steering system for an aircraft as claimed in claim 1, in which the a.c. nose wheel angular follow-up signal ($N_c$) is connected into said circuit means in opposite phase relation to that of the pilot command signal ($R_c$) thereat and provide a final control signal ($C_s$) to said servomotor means whereby its deflection of the nose wheel is within the range established by the variable authority command.

* * * * *